(12) United States Patent
Heller

(10) Patent No.: US 8,408,624 B2
(45) Date of Patent: *Apr. 2, 2013

(54) VEHICLE BARRIER

(76) Inventor: Donna Heller, Riverside, CT (US)

( * ) Notice: Subject to any disclaimer, the term of this patent is extended or adjusted under 35 U.S.C. 154(b) by 221 days.

This patent is subject to a terminal disclaimer.

(21) Appl. No.: 12/916,832

(22) Filed: Nov. 1, 2010

(65) Prior Publication Data

US 2011/0042989 A1 Feb. 24, 2011

Related U.S. Application Data

(63) Continuation-in-part of application No. 12/424,210, filed on Apr. 15, 2009, now Pat. No. 7,857,370.

(51) Int. Cl.
*B60R 21/02* (2006.01)
(52) U.S. Cl. ..................... 296/24.46; 119/496
(58) Field of Classification Search ............... 296/24.46, 296/24.42; 119/496
See application file for complete search history.

(56) References Cited

U.S. PATENT DOCUMENTS

| | | | |
|---|---|---|---|
| 2,648,072 A | 8/1953 | De Blieux | |
| 3,600,725 A | 8/1971 | McCartney | |
| 3,648,306 A | 3/1972 | Auerbach | |
| 3,652,120 A | 3/1972 | Bernbach | |
| 3,696,449 A | 10/1972 | Smith | |
| 4,943,105 A | 7/1990 | Kacar et al. | |
| 5,185,896 A | 2/1993 | Bonda | |
| 5,511,842 A * | 4/1996 | Dillon | 296/24.42 |
| 5,971,487 A * | 10/1999 | Passehl | 297/464 |
| 6,962,382 B2 | 11/2005 | Scarlett | |
| 6,983,969 B2 * | 1/2006 | Murray et al. | 296/24.4 |
| 7,857,370 B2 * | 12/2010 | Heller | 296/24.46 |
| 2002/0180229 A1 | 12/2002 | Wheat | |
| 2003/0057722 A1 | 3/2003 | Dolman | |
| 2004/0232719 A1 | 11/2004 | Scarlett | |

FOREIGN PATENT DOCUMENTS

| | | |
|---|---|---|
| EP | 0571082 A1 | 11/1993 |
| FR | 2325541 | 4/1977 |

OTHER PUBLICATIONS

The Roof Box Company,<http://www.roofbox.co.uk/scripts/rbvehsel4.php?query=ERDB-FF&emulate=accgen>, three pages with Wayback Machine date of Jun. 17, 2007.

* cited by examiner

*Primary Examiner* — Dennis Pedder
(74) *Attorney, Agent, or Firm* — Blank Rome LLP

(57) ABSTRACT

A barrier for a vehicle that comprises a main section adapted to reside in a vehicle footwell and the main section has a width that is defined between opposite first and second ends thereof that is about half of a width of the vehicle footwell. A divider section is disposed substantially perpendicularly to the main section. The divider section is configured to rest on a vehicle seat. The divider section defines a length between opposite first and second ends thereof. The length of the divider section is substantially the distance from one of the first and second ends of the main section to a back of the vehicle seat, whereby the divider section is configured to define first and second discrete areas in the vehicle such that the divider section is located between the first and second discrete areas.

28 Claims, 10 Drawing Sheets

VEHICLE BARRIER

RELATED APPLICATION

This application is a Continuation-In-Part Application under 35 U.S.C. §120 of application Ser. No. 12/424,210, filed Apr. 15, 2009, the subject matter of which is hereby incorporated by reference.

FIELD OF THE INVENTION

The present invention relates to a barrier used in a vehicle. More specifically, the present invention relates to a barrier that safely restrains a pet or the like in a vehicle.

BACKGROUND OF THE INVENTION

Barriers for vehicles have been developed that allow safe travel with a pet by preventing the pet from entering the driver's area of the vehicle. Conventional pet barriers often require attachment mechanisms for insuring the barrier is secured in the vehicle, such as in the vehicle's cargo area or rear passenger seat, in order to confine the pet. Conventional barriers often impair the driver's view because the barriers must be secured to the walls or seats of the vehicle including the top and bottom walls of the vehicle body. The attachment mechanisms of the conventional barriers also complicate installation and assembly of the barrier in the vehicle, as well as removal of the barrier from the vehicle. Additionally, conventional barriers fail to provide for the safety and comfort of the pet while traveling.

Examples of conventional pet barriers for vehicles includes U.S. Pat. Nos. 6,962,382 to Scarlett; 6,923,487 to Wang; 4,943,105 to Kacar et al.; and 4,924,814 to Beaudet; the subject matter of each of which is hereby incorporated by reference.

SUMMARY OF THE INVENTION

Accordingly, the present invention provides a barrier for a vehicle that includes first and second substantially solid identical sections. The first and second sections are adapted to reside in a vehicle footwell between first and second vehicle seats. Each of the sections includes opposite first and second main panels, opposite first and second side panels extending between the first and second main panels, and opposite first and second end panels extending between the first and second main panels and between the first and second side panels. The thickness of each section is defined by the distance between the first and second main panels and the thickness is substantially equal to the shortest distance between the first and second seats. One of the first and second side panels includes a mating surface having a fastener for coupling the first and second sections.

The present invention may also provide a barrier for a vehicle comprising a plurality of substantially solid sections. The sections are adapted to reside in a vehicle footwell between first and second vehicle seats. Each of the sections includes opposite first and second main panels. The thickness of each section is defined by the distance between the first and second main panels. The thickness is substantially equal to the shortest distance between the first and second seats. Each of the sections includes opposite first and second side panels extending between the first and second main panels wherein a width of each section is defined by the distance between the first and second side panels. Each of the sections includes opposite first and second end panels extending between the first and second main panels and between the first and second side panels wherein the height of each section is defined by the distance between the first and second end panels. The height is substantially equal to at least the height of the first seat.

The present invention may also provide a barrier for a vehicle that comprises at least one substantially solid section adapted to reside in a vehicle footwell between front and rear vehicle seats. The at least one section includes opposite first and second main panels wherein the thickness of the at least one section is defined by the distance between the first and second main panels. The thickness is substantially equal to the shortest distance between the front and rear seats. The at least one section includes opposite first and second side panels extending between the first and second main panels wherein a width of the at least one section is defined by the distance between the first and second side panels. The at least one section includes opposite first and second end panels extending between the first and second main panels and between the first and second side panels. A height of the at least one section is defined by the distance between the first and second end panels. The height is substantially equal to at least the height of the front seat. The at least one section includes a cut-out portion, wherein the cut-out portion is shaped to substantially conform to the shape of a hump of the footwell of the vehicle.

The present invention may further provide a barrier for a vehicle that comprises a main section adapted to reside in a vehicle footwell and the main section has a width that is defined between opposite first and second ends thereof that is about half of the width of the vehicle footwell. A divider section is disposed substantially perpendicularly to the main section. The divider section is configured to rest on a vehicle seat. The divider section defines a length between opposite first and second ends thereof. The length of the divider section is substantially the distance from one of the first and second ends of the main section to a back of the vehicle seat, whereby said divider section is configured to define first and second discrete areas in the vehicle such that said divider section is located between said first and second discrete areas.

Other objects, advantages and salient features of the invention will become apparent from the following detailed description, which, taken in conjunction with the annexed drawings, discloses a preferred embodiment of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EXEMPLARY EMBODIMENT

Figure 1:
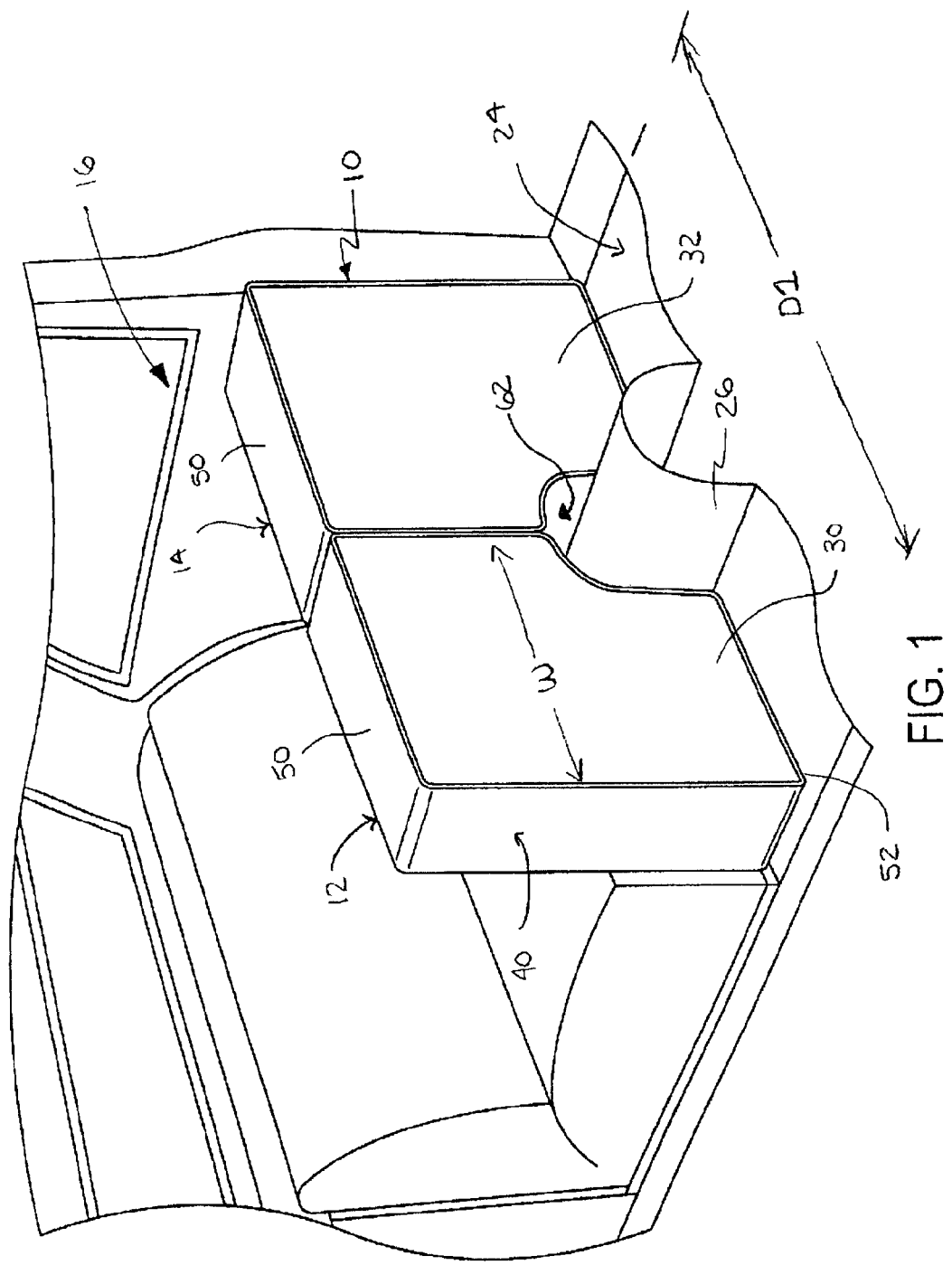
FIG. 1 is a perspective view of a barrier according to a first exemplary embodiment of the present invention, showing the barrier installed in the cab of a vehicle.

Referring to FIGS. 1-4, a vehicle barrier 10 according to an exemplary embodiment of the present invention generally includes two substantially identical vehicle sections 12 and 14. To safely confine a pet, the sections 12 and 14 together extend substantially the width of the vehicle's passenger cab 16 and have a height sufficient to prevent the pet from entering the driver's area 18 while also not obstructing the driver's view. The sections 12 and 14 do not include any of the conventional attachment mechanisms for attaching them inside the vehicle's cab. Such attachment mechanisms are not needed for the barrier 10 because its sections 12 and 14 are sized and shaped to fit securely within the vehicle's cab 16 and particularly between the front and rear seats 20 and 22 of the vehicle and in the vehicle's footwell 24. The seats 20 and 22 may be any conventional vehicle seat, such as bench or bucket. The design of the barrier 10 makes it easy to manufacture, install, and remove from the vehicle's cab.

Each of the sections 12 and 14 may include first and second main panels 30 and 32, first and second side panels 40 and 42 extending between the main panels 30 and 32, and first and second end panels 50 and 52 extending between both the main panels 30 and 32 and the side panels 40 and 42. Each section 12 and 14 is preferably formed of a cushion material to provide comfort to the pet and prevent injury that could result from movement of the vehicle. That is a cushion may be provided inside of the panels 30, 32, 40, 42, 50 and 52 and the panels may be formed of any fabric, leather or plastic material. The sections 12 and 14 and their panels, however, can be formed of any material, such as mesh, netting, wood, or metal. Alternatively, the entire section including the panels may be a cushion, such as a foam material. That is, the sections 12 and 14 may be substantially solid. For example, the sections 12 and 14 may be molded foam or plastic (with or without fabric, plastic, vinyl or leather covers).

Figure 2:
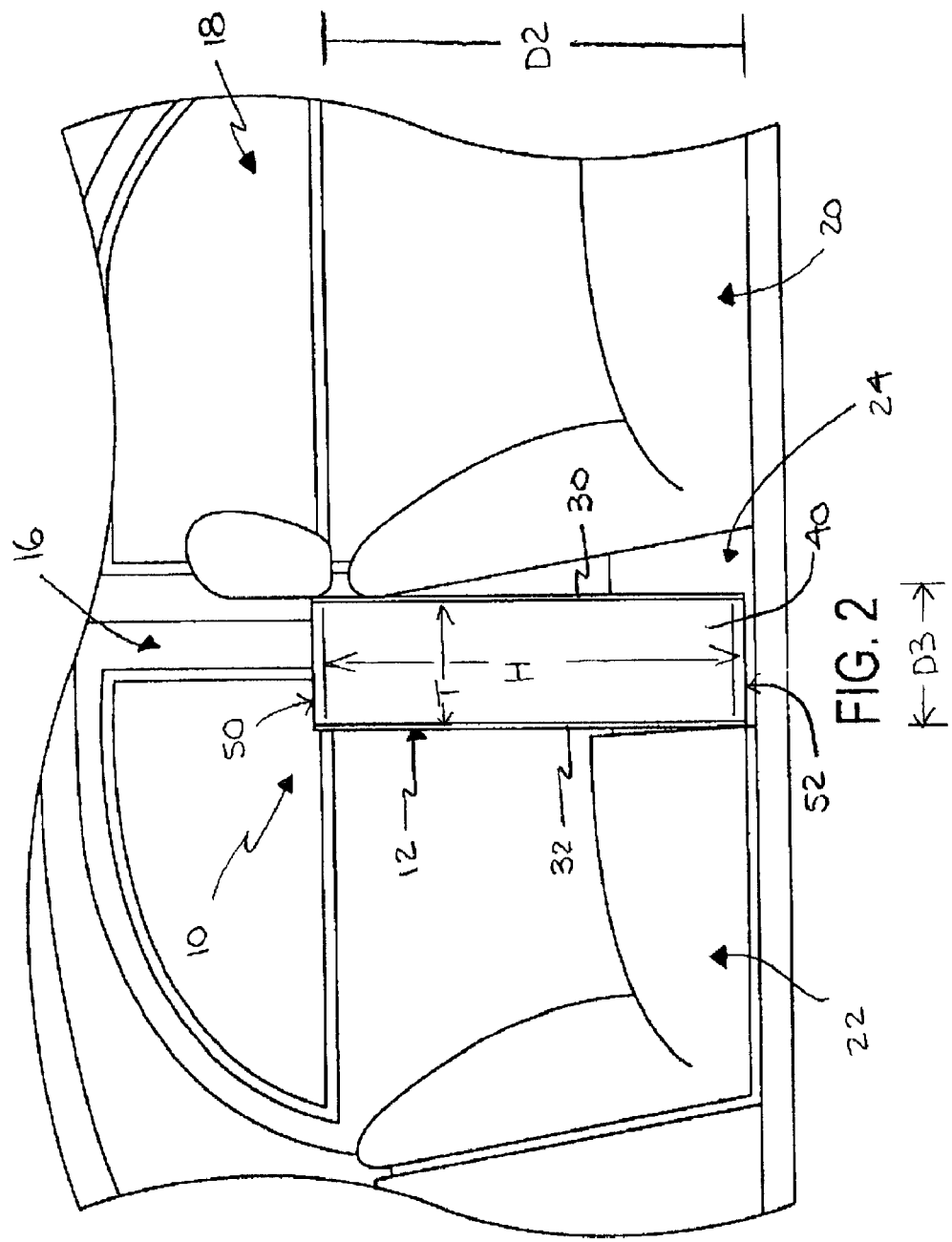
FIG. 2 is a side elevational view of the barrier and the vehicle's cab illustrated in FIG. 1.

As seen in FIG. 1, it is preferable that the width W of each section 12 and 14, which is the distance between the first and second side panels 40 and 42, is approximately half of the width D1 of the footwell 24. That is, when both sections are installed in the vehicle, their combined width extends across the interior of the vehicle's cab to substantially prevent the pet from entering the driver's area. The height H of each section 12 and 14 is the distance between the end panels 50 and 52, and is preferably substantially equal to at least the height D2 of the front seat 20, as best seen in FIG. 2. A headrest 28 may be attached to the front seat 20; however, the height H of each section 12 and 14 preferably does not extend above the head rest 28, thereby avoiding obstruction of the driver's view. That is the sections 12 and 14 preferably end at the bottom of the headrest 28. The thickness T of each section 12 and 14, which is the distance between the main panels 30 and 32, is preferably substantially equal to the smallest distance between the front and rear seats 20 and 22, thereby substantially filling up the footwell 24 to prevent the pet from falling into the footwell.

Figure 3:
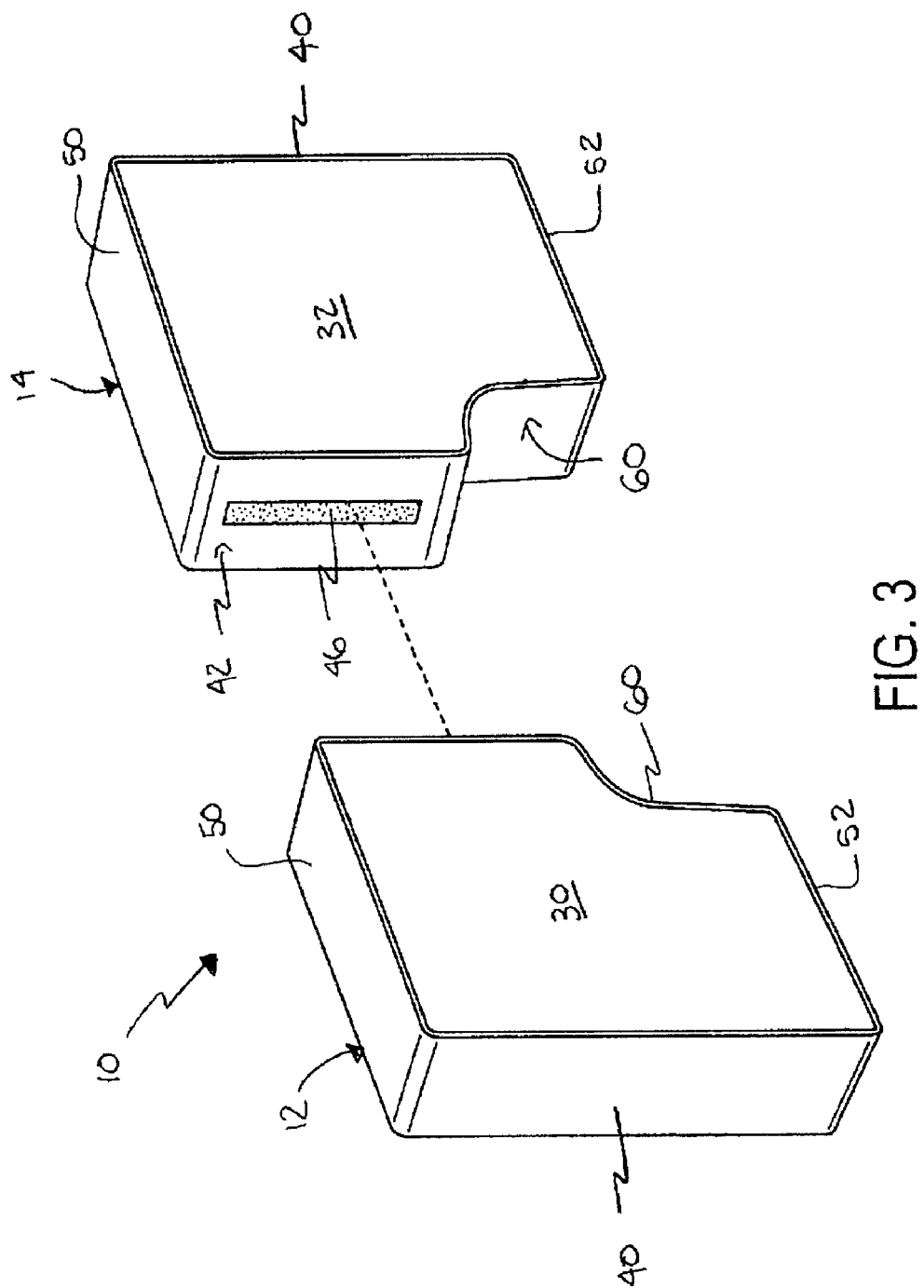
FIG. 3 is an exploded perspective view of the barrier illustrated in FIG. 1, showing first and second sections of the barrier.

The second side panel 42 of the sections 12 and 14 may include a mating surface 44 and a fastener 46, as seen in FIG. 3 (showing the mating surface 44 and the fastener 46 of the section 14). The fasteners 46 may be any known fasteners to couple the two sections together 12 and 14. Preferably, the fasteners 46 are hook and loop fasteners, such as VELCRO. By coupling the sections 12 and 14 together at their mating surfaces 44, the sections form the barrier 10 which extends generally the width of the vehicle's interior cab 16, as seen in FIGS. 1 and 4.

Figure 4:
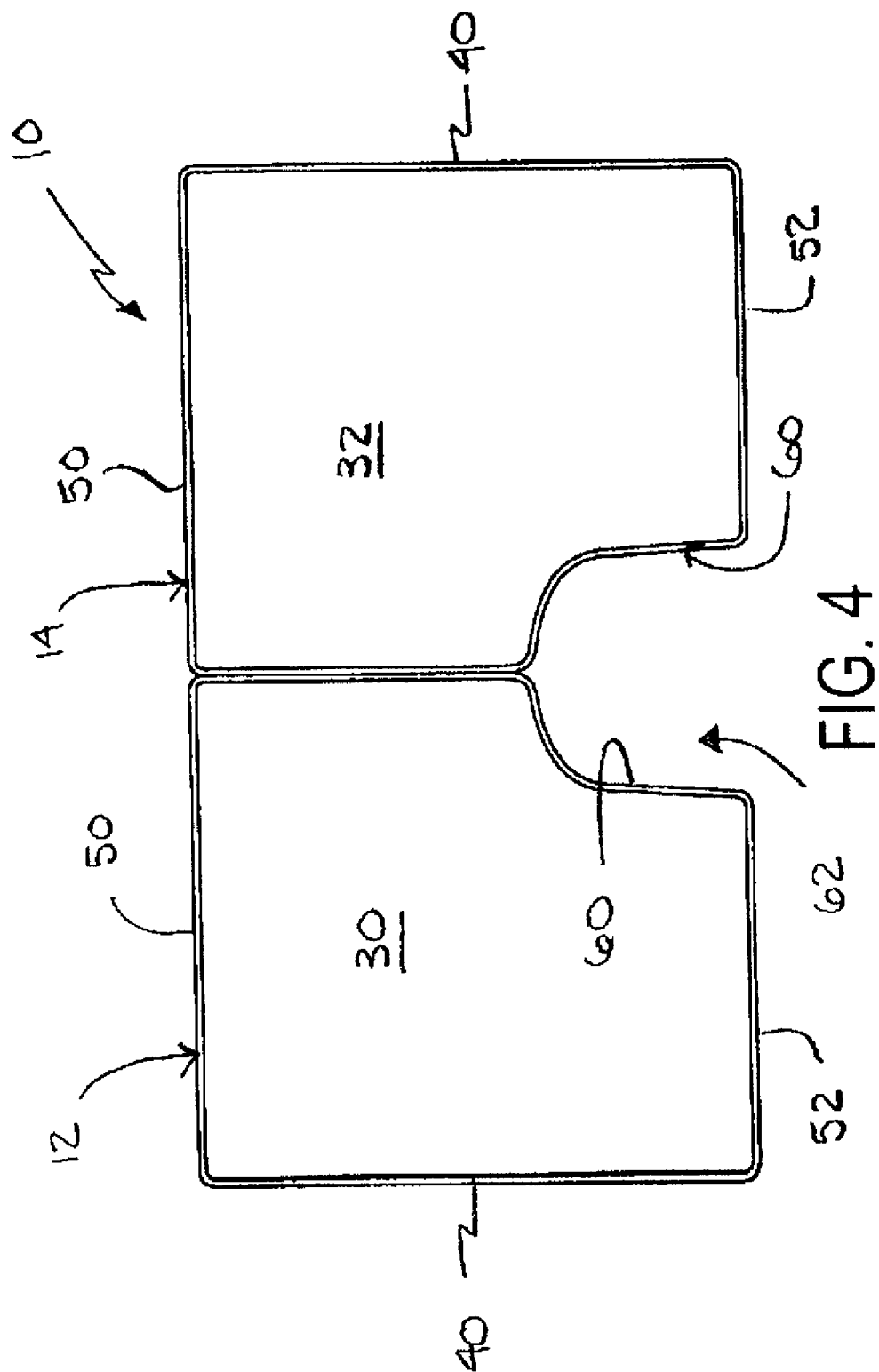
FIG. 4 is a side elevational view of the barrier illustrated in FIG. 1, showing the first and second sections coupled together.

As best seen in FIGS. 1 and 4, each section 12 and 14 may optionally include a cutout portion 60 in the second side panel 42 to accommodate an obstruction in the vehicle's footwell 24, such as a hump 26. The cutout portions 60 form an area 62 that generally conforms to the shape of the hump 26.

In use, the barrier 10 is easily installed in the vehicle's cab 16 by placing the sections 12 and 14 side-by-side in the vehicle's footwell 24 and coupling the two sections together at their mating surfaces 44 using their fasteners 46. The dimensions and size of the sections 12 and 14 confine the pet to the rear seat 22, prevent the pet from falling into the footwell 24 or going into the driver's area 18, and leave the driver's view unobstructed. Because the sections 12 and 14 are preferably cushion sections, injury to the pet from movement of the vehicle is reduced while providing the pet a comfortable environment.

Figure 5:
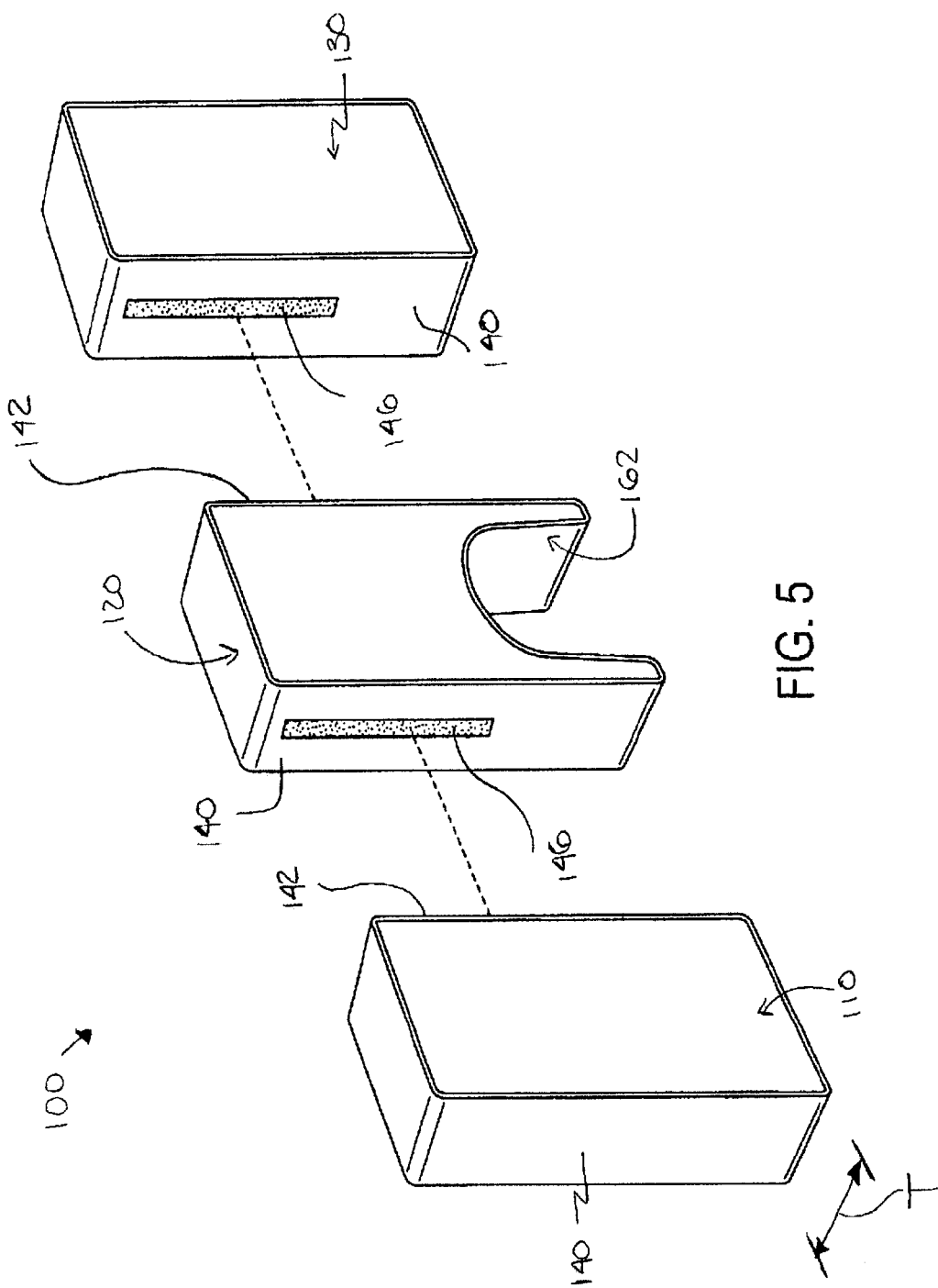
FIG. 5 is a perspective view of a barrier according to a second exemplary embodiment of the present invention, showing the first, second, and third sections of the barrier.
Figure 6:
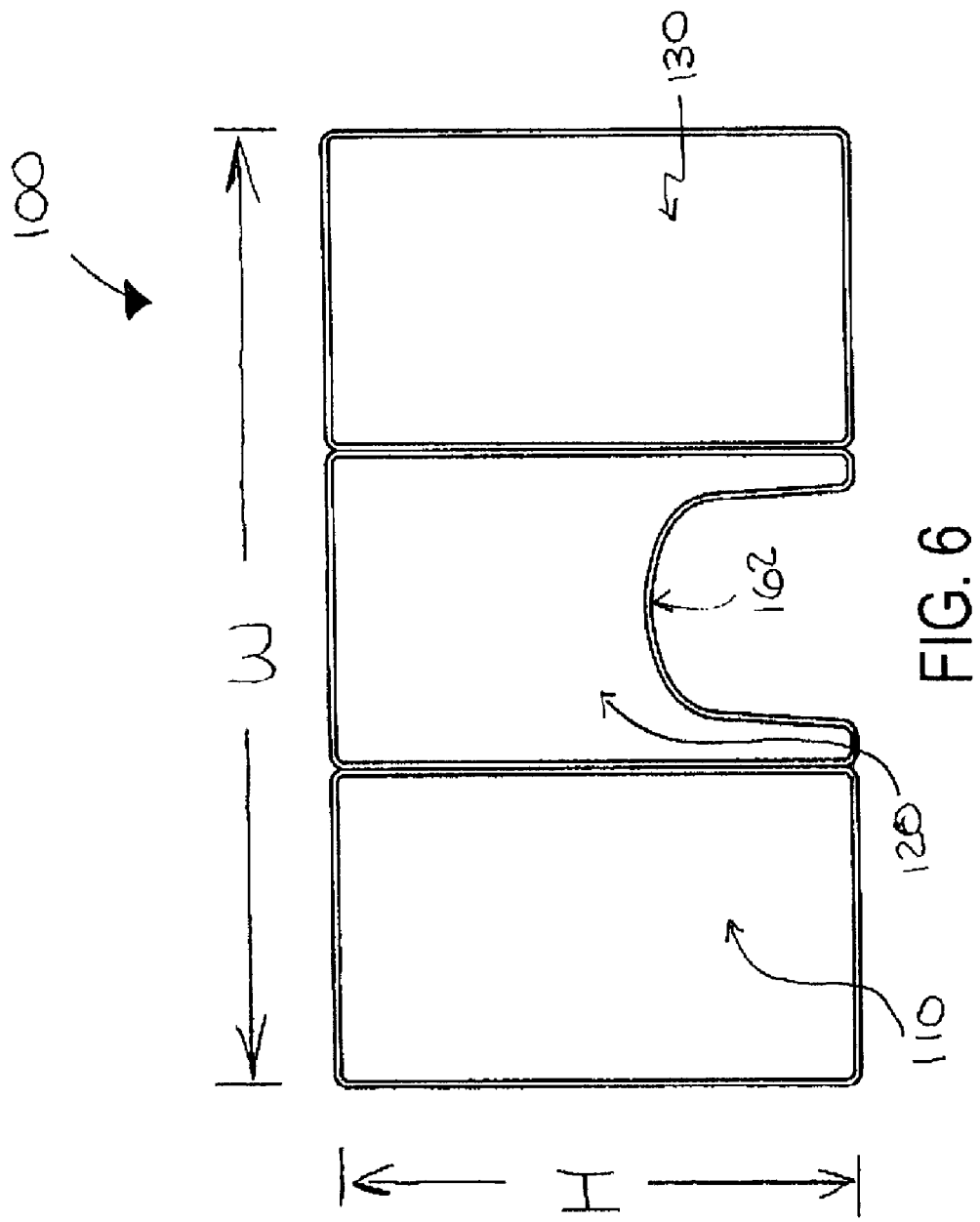
FIG. 6 is a side elevational view of the barrier illustrated in FIG. 5 showing the first, second, and third sections coupled together.

The barrier may be formed using any number of sections. For example, a barrier 100 according to a second embodiment of the present invention, may be formed of first, second and third sections 110, 120, and 130, as illustrated in FIGS. 5 and 6. The first and third sections 110 and 130 are preferably substantially identical. Like the first embodiment, fasteners 146, such as hook and loop, may be provided on the side panels 140 and 142 of the sections to couple the sections 110, 120 and 130 together. The second section 120 may include a cut-out portion 162 similar to the first embodiment to accommodate an obstruction in the vehicle's footwell.

Similar to the barrier 10 of the first embodiment, when the first, second, and third sections 110, 120, and 130 are coupled together, the width W (FIG. 6) of the barrier 100 is substantially the same as the width of the vehicle's interior cab. Also like to first embodiment, the thickness T (FIG. 5) of each section substantially fills the vehicle's footwell, and the height H (FIG. 6) of each section is such that the driver's view is unobstructed. The barrier 100 may be installed in the vehicle's cab in a manner similar to the barrier 10 of the first embodiment as described above.

Figure 7:
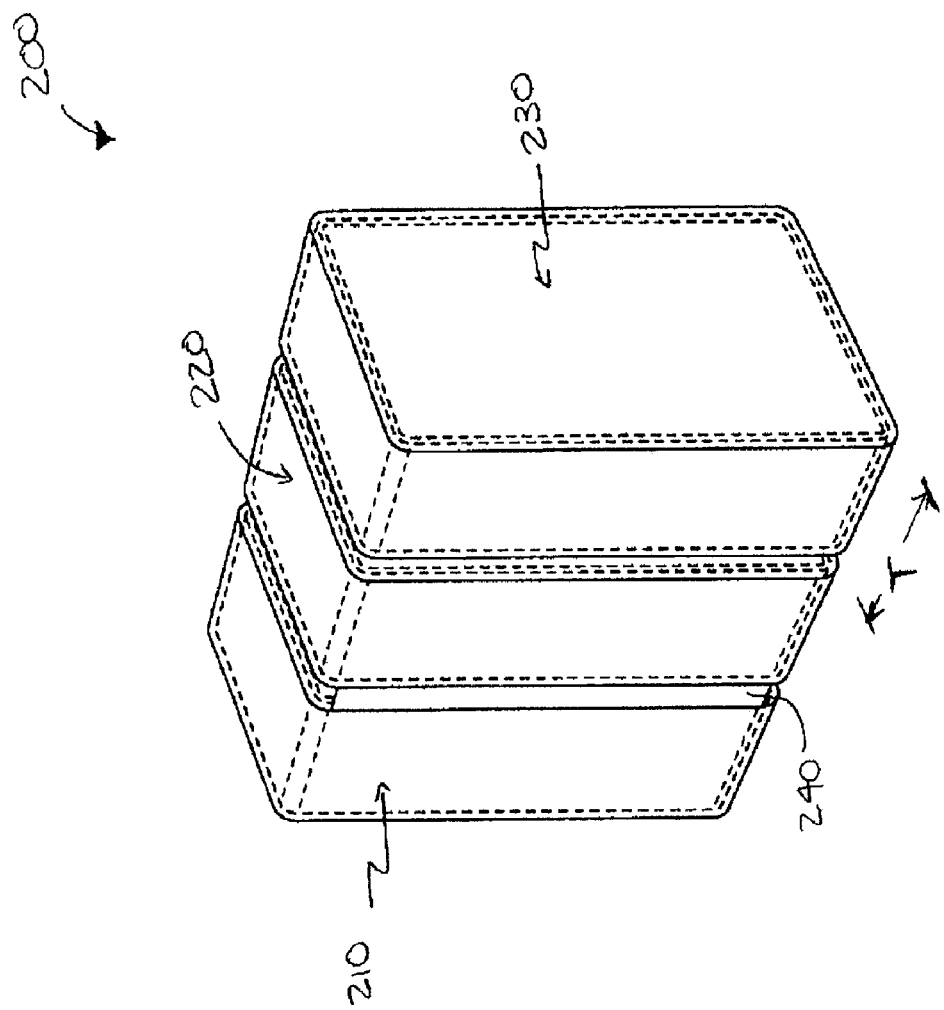
FIG. 7 is a perspective view of a barrier according to a third exemplary embodiment of the present invention, showing the barrier in a folded position.
Figure 8:
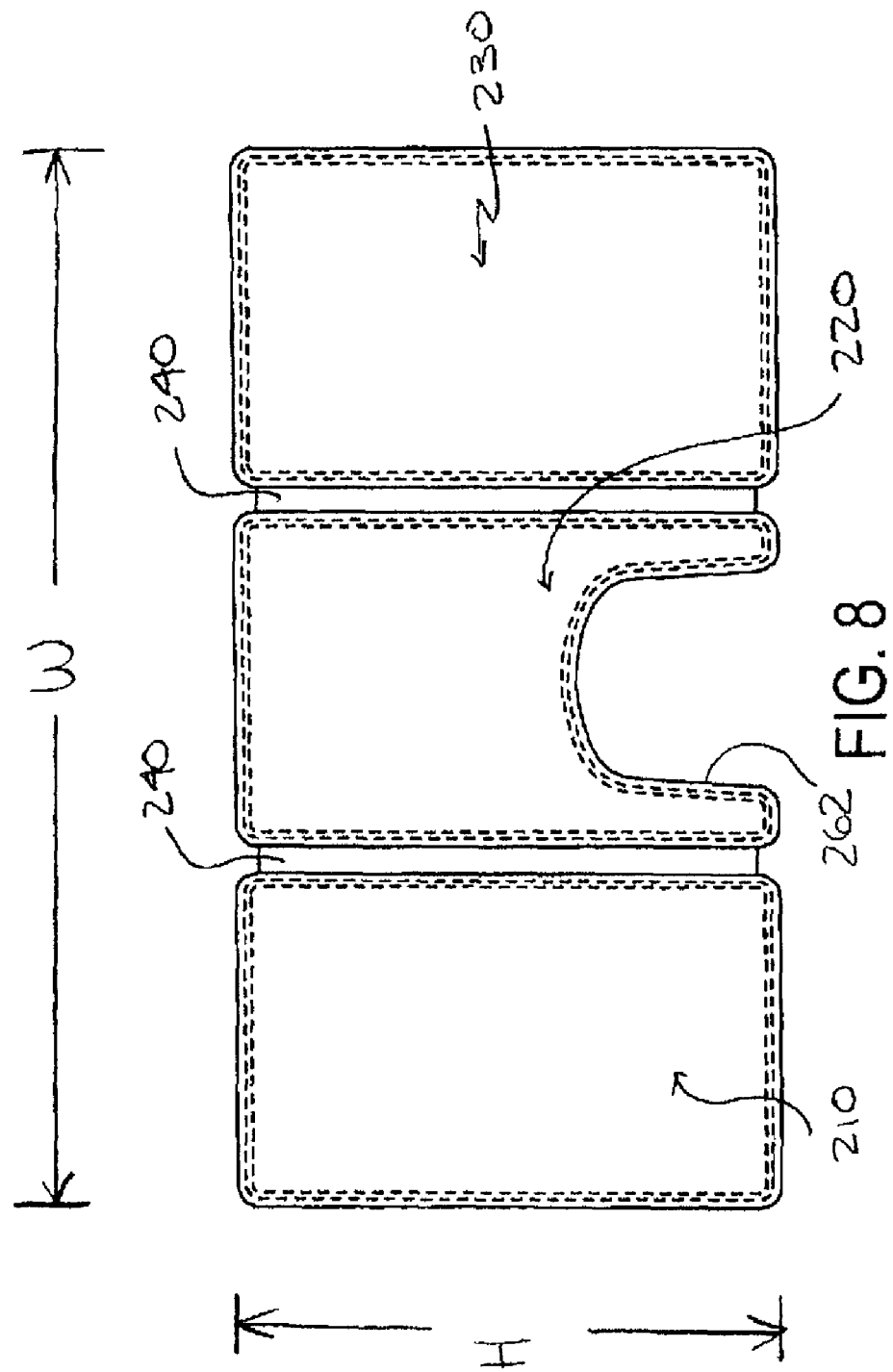
FIG. 8 is a side elevational view of the barrier illustrated in FIG. 7, showing the bather in an unfolded position.
Figure 9:
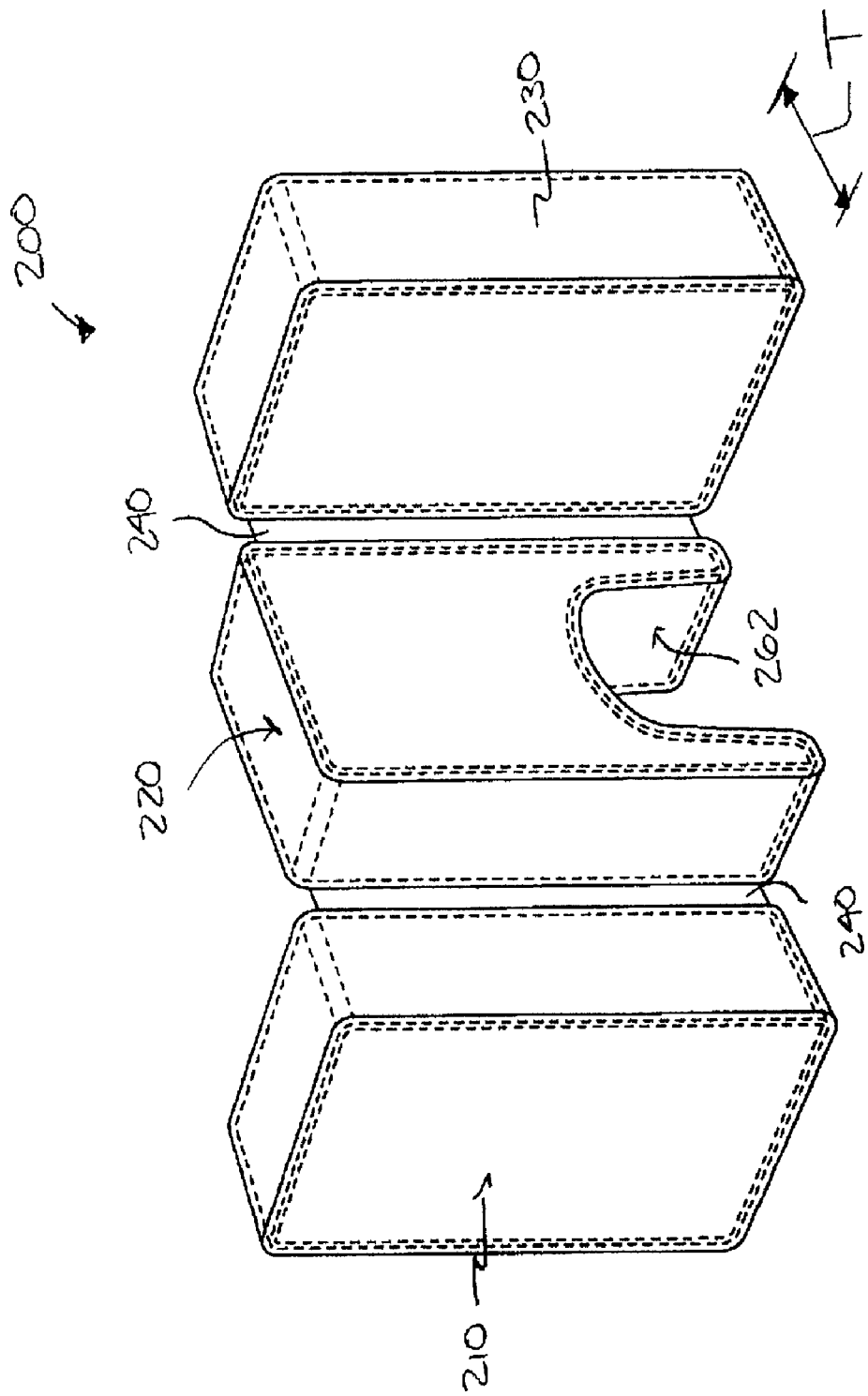
FIG. 9 is a perspective view of the barrier illustrated in FIG. 7, showing the barrier in a partially folded position.

The barrier may also be formed as one member that is foldable. For example, a barrier 200 according to a third embodiment of the present invention includes first, second, and third sections 210, 220, and 230 having foldable pieces 240 (FIG. 8) therebetween. Alternatively, the barrier 200 may include less than or more than 3 sections. The foldable pieces 240 allow the barrier 200 to be easily folded, as seen in FIG. 7, and unfolded, as seen in FIG. 8. Each section is preferably substantially identical in size; however, the sections 210, 220, and 230 may be different sizes. As with the first and second embodiments, the width of each section is such that the width W (FIG. 8) of the barrier 200 extends across the inside of the vehicle's cab; the thickness T (FIG. 9) of each section substantially fills the vehicle's footwell; and the height H (FIG. 8) of each section is such that the barrier 200 does not obstruct the driver's view. The second or middle section 220 may include a cut-out portion 262 like those of the first and second embodiments. Like the second embodiment, the first and second sections 210 and 230 of the barrier 200 are preferably substantially identical. Foldable pieces 240 may be eliminated by dividing the one-piece barrier, such as by stitching, into a plurality of foldable sections, such as the three sections 210, 220, and 230.

Figure 10:
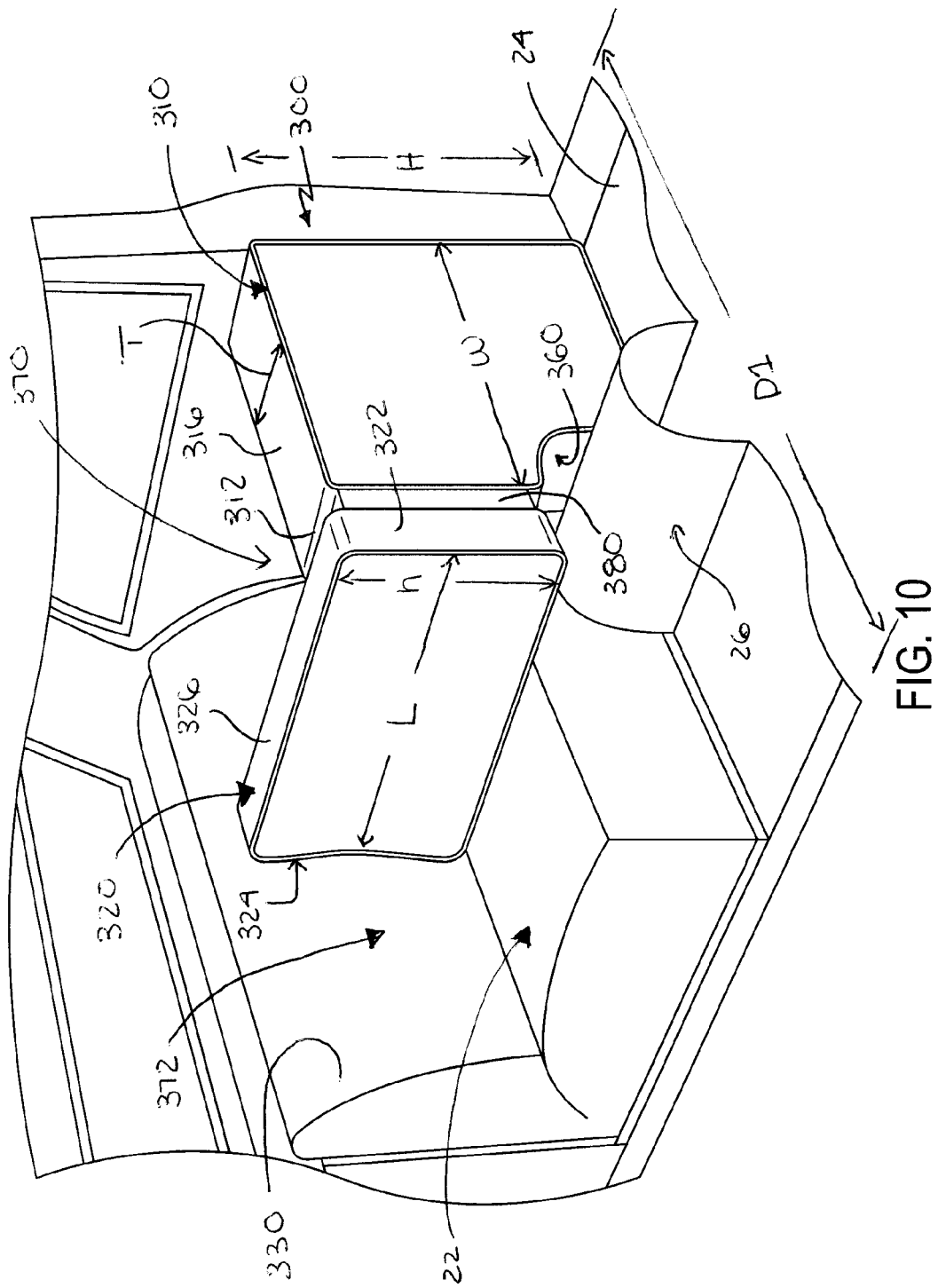
FIG. 10 is a perspective view of a barrier according to a fourth exemplary embodiment of the present invention, showing the barrier installed in the cab of a vehicle.

Referring to FIG. 10, a bather 300 according to a fourth exemplary embodiment of the present invention generally includes a main section 310 that rests in the footwell 24 and a divider section 320 that extends over or between seats 22 of the vehicle's cab. The vehicle footwell may be any area of the vehicle that accommodates passenger feet. Like the sections of the above embodiments, the sections 310 and 320 can be made of any material, such as a material that is substantially cushion, foam, rigid, solid, or the like. Preferably, the sections 310 and 320 themselves are not collapsible or inflatable. The main section 310 is substantially similar to either of the sections 12 and 14 of the barrier 10 of the first embodiment in that it has a width W that is about half of the width D1 of the footwell 24, a thickness T that generally fills up the footwell 24, and a height H that is about the height of the front seat. The main section 310 may also optionally include a cutout portion 360 to conform to a hump 26 of the footwell 24.

Unlike in the first embodiment, the bather 300 does not include a second substantially identical section. Instead, the divider section 320 is provided which extends substantially perpendicularly to the main section 310 to divide the vehicle's cab into first and second distinct areas 370 and 372. The divider section 320 has a length L defined between first and second ends 322 and 324 of the divider section 320. The length L is preferably substantially the distance from the main section 310 to the back 330 of the seat or seats such that little or no space is left between the seat back 330 and the second end 324 of the divider section 320. The top 326 of the divider section 320 is generally flush with the top 316 of the main section 310; however, the height h of the divider section 320 is less than that of the main section 310 because the divider section 320 rests on the seat or between seats and not in the footwell 24 like the main section 310.

A panel 380 may provided between the first end 322 of the divider section 320 and an end 312 of the main section 310 such that the two sections 310 and 320 can be easily folded and unfolded with respect to one another while remaining attached. Alternatively, fasteners (not shown), such as hook and loop may be provided between the first end 322 of the divider section 320 and the end 312 of the main section 310 to detachably couple the sections. In yet another alternative, the divider and main sections 320 and 310 can be separate such that no attachment mechanism is provided therebetween.

As seen in FIG. 10, the first discrete area 370 is defined or bordered by the main section 310, the divider section 320, and the seat back 330. Thus, the area 370 is configured to safely confine a pet or the like, for example. The second discrete area 372 is opposite the first area 370 and is separated therefrom by the divider section 320. The divider section 320 may serve to separate a pet, for example, from a passenger or items, such as groceries, in the second area 372.

While particular embodiments have been chosen to illustrate the invention, it will be understood by those skilled in the art that various changes and modifications can be made therein without departing from the scope of the invention as defined in the appended claims. For example, any of the barriers 10, 100, 200 and 300 may use any number of sections, including one section. That is, the barrier may be one section with an optional cut-out or multiple sections. Also, the present invention is not limited to restraining pets. The barrier may also be used for people, such as children, or things, such as groceries, breakable objects, etc.

What is claimed is:

1. A barrier for a vehicle, comprising of:
   first and second substantially solid identical sections, said first and second sections being adapted to reside in a vehicle footwell between first and second vehicle seats, each of said sections including,
      opposite first and second main panels,
      opposite first and second side panels extending between said first and second main panels,
      opposite first and second end panels extending between said first and second main panels and between said first and second side panels,
   wherein a thickness of each section is defined by the distance between said first and second main panels, said thickness being substantially equal to the shortest distance between the first and second seats, and
   wherein one of said first and second side panels includes a mating surface having a fastener for coupling the first and second sections.

2. A barrier according to claim 1, wherein
each of said sections includes a cut-out portion, said cut-out portions being shaped to substantially conform to the shape of a hump in the footwell of the vehicle.

3. A barrier according to claim 1, wherein
a width of each section is defined by the distance between said first and second side panels, said width being substantially equal to at least half the width of the footwell.

4. A barrier according to claim 1, wherein
a height of each section is defined by the distance between said first and second end panels, said height being substantially equal to at least the height of the first seat.

5. A barrier according to claim 1, wherein
said sections are made of a cushion material.

6. A barrier according to claim 1, wherein
said fastener is hook and loop such that said mating surfaces of said sections abut one another.

7. A barrier according to claim 1, wherein
said first seat is a front seat of the vehicle and said second seat is a rear seat of the vehicle.

8. A barrier for a vehicle, comprising of:
   a plurality of substantially solid sections, said sections being adapted to reside in a vehicle footwell between first and second vehicle seats, each of said sections including,
   opposite first and second main panels wherein a thickness of each section is defined by the distance between said first and second main panels, said thickness being substantially equal to the shortest distance between the first and second seats,
   opposite first and second side panels extending between said first and second main panels wherein a width of each section is defined by the distance between said first and second side panels, and
   opposite first and second end panels extending between said first and second main panels and between said first and second side panels wherein a height of each section is defined by the distance between said first and second end panels, said height being substantially equal to at least the height of the first seat.

9. A barrier according to claim 8, wherein
at least first and second sections of said plurality of sections being substantially identical.

10. A barrier according to claim 9, wherein
said width of each of said substantially identical first and second sections being substantially equal to at least half the width of the footwell.

11. A barrier according to claim 9, wherein
a third section of said plurality of sections includes a cut-out portion shaped to substantially conform to the shape of the hump in the footwell of the vehicle.

12. A barrier according to claim 8, further comprising
a fastener disposed on at least one of said first and second side panels of said sections for coupling said sections together.

13. A barrier according to claim 12, wherein
said fastener is hook and loop.

14. A barrier according to claim 8, wherein
at least one of said sections includes a cut-out portion, wherein said cut-out portion is shaped to substantially conform to the shape of a hump of the footwell of the vehicle.

15. A barrier according to claim 8, wherein
the first seat is a front seat;
a head rest is attached to the front seat; and
said height of each of said sections does not extend beyond the head rest.

16. A barrier according to claim 8, wherein
said sections being foldable with respect to one another, thereby forming a one-piece barrier.

17. A barrier for a vehicle, comprising of:
at least one substantially solid section adapted to reside in a vehicle footwell between front and rear vehicle seats, said at least one section including,
opposite first and second main panels wherein a thickness of said at least one section is defined by the distance between said first and second main panels, said thickness being substantially equal to the shortest distance between the front and rear seats,
opposite first and second side panels extending between said first and second main panels wherein a width of said at least one section is defined by the distance between said first and second side panels,
opposite first and second end panels extending between said first and second main panels and between said first and second side panels wherein a height of said at least one section is defined by the distance between said first and second end panels, said height being substantially equal to at least the height of the front seat, and
a cut-out portion, wherein said cut-out portion is shaped to substantially conform to the shape of a hump of the footwell of the vehicle.

18. A barrier according to claim 17, wherein
said height of said section does not extend beyond a head rest.

19. A barrier according to claim 17, wherein
said width of said at least one section extends substantially the width of the vehicle.

20. A barrier according to claim 17, further comprising
a second section, said second section being substantially identical to said at least one section.

21. A barrier for a vehicle, comprising of:
at least one section adapted to reside in a vehicle footwell between first and second vehicle seats, said at least one section including,
opposite first and second main panels,
opposite first and second side panels extending between said first and second main panels,
opposite first and second end panels extending between said first and second main panels and between said first and second side panels,
wherein a thickness of said at least one section is defined by the distance between said first and second main panels, said thickness being substantially equal to the shortest distance between said first and second seats, and
wherein said at least one section is substantially foam, substantially solid, or substantially rigid.

22. A barrier according to claim 21, wherein
a width of said at least one section is defined by the distance between said first and second side panels, said width being substantially equal to at least half the width of the footwell.

23. A barrier according to claim 21, wherein
said at least one section includes a cut-out portion that is shaped to conform to the shape of a hump in the footwell of the vehicle.

24. A barrier according to claim 21, further comprising
a second section adapted to reside in the vehicle footwell between said first and second vehicle seats, said second section being substantially identical to said at least one section, and
said second section is substantially foam, substantially solid, or substantially rigid.

25. A barrier according to claim 24, wherein
said second section includes,
opposite first and second side panels extending between said first and second main panels,
opposite first and second end panels extending between said first and second main panels and between said first and second side panels,
wherein a thickness of said second section is defined by the distance between said first and second main panels, said thickness being substantially equal to the shortest distance between said first and second seats.

26. A barrier according to claim 25, wherein
a width of said second section is defined by the distance between said first and second side panels, said width being substantially equal to at least half the width of the footwell.

27. A barrier according to claim 25, wherein
each of said at least one section and said second section includes a cut-out portion that is shaped to conform to the shape of a hump in the footwell of the vehicle.

28. A barrier according to claim 21, wherein
said first seat is a front seat of the vehicle and said second seat is a rear seat of the vehicle.

* * * * *